United States Patent [19]

Shaw

[11] Patent Number: 4,553,593
[45] Date of Patent: Nov. 19, 1985

[54] OIL RECOVERY METHOD

[75] Inventor: James E. Shaw, Bartlesville, Okla.

[73] Assignee: Phillips Petroleum Company, Bartlesville, Okla.

[21] Appl. No.: 618,292

[22] Filed: Jun. 7, 1984

[51] Int. Cl.⁴ .............................................. E21B 43/22
[52] U.S. Cl. .................................... 166/270; 166/273; 166/274; 252/8.55 D
[58] Field of Search ...................... 166/270, 273, 274; 252/8.55 D

[56] References Cited

U.S. PATENT DOCUMENTS

| | | | |
|---|---|---|---|
| 2,766,182 | 10/1956 | Wilhelmus Le Nobel et al. | 196/29 |
| 3,195,629 | 7/1965 | Leach | 166/273 |
| 3,358,757 | 12/1967 | Holmes | 166/270 |
| 3,478,823 | 11/1969 | Murphy | 166/274 |
| 3,556,221 | 1/1971 | Haws et al. | 166/305 R |
| 3,637,017 | 1/1972 | Gale et al. | 166/273 X |
| 3,709,297 | 1/1973 | Christopher et al. | 166/274 X |
| 3,730,271 | 5/1973 | Gall | 166/294 |
| 3,757,861 | 9/1973 | Routson | 166/273 |
| 3,833,061 | 9/1974 | Gall | 166/294 |
| 3,927,716 | 12/1975 | Burdyn et al. | 166/270 |
| 3,977,470 | 8/1976 | Chang | 166/274 X |
| 4,014,801 | 3/1977 | Fullinwider et al. | 252/8.55 D |
| 4,037,656 | 8/1977 | Cooper | 166/270 |
| 4,043,922 | 8/1977 | Palmer et al. | 252/8.55 D |
| 4,216,098 | 8/1980 | Hunter | 252/8.55 D |
| 4,228,016 | 10/1980 | Hunter | 252/8.55 D |
| 4,473,118 | 9/1984 | Wauquier et al. | 166/274 |

OTHER PUBLICATIONS

J. C. S. Perkin I, pp. 222–228, May 15, 1973.

*Primary Examiner*—George A. Suchfield
*Attorney, Agent, or Firm*—Howard D. Doescher

[57] ABSTRACT

Enhanced oil recovery process comprising the injection of aqueous alkaline hypochlorite solution and aqueous alkaline alcohol solution into a subterranean formation to react with crude oil and form carboxylate surfactants in-situ. In a preferred embodiment, aqueous alkaline hypochlorite solution is followed by injection of an aqueous alcohol solution to form a carboxylate-alcohol surfactant system and then an aqueous mobility buffer.

10 Claims, No Drawings

OIL RECOVERY METHOD

FIELD OF THE INVENTION

This invention pertains to the recovery of petroleum from subterranean oil-bearing formations. In another aspect, this invention relates to post primary oil recovery employing a surfactant system formed in situ. In accordance with still another aspect, this invention relates to the production of a carboxylate surfactant system using in-place crude oil as a hydrocarbon feedstock for oxidation. In accordance with a further aspect, this invention relates to a chemical method of tertiary oil recovery, including chemical modification of crude oil in place to produce surfactants in situ.

BACKGROUND OF THE INVENTION

Oil found within a subterranean formation is recovered or produced through wells called production wells which are drilled into the subterranean formation. Generally, a large amount of the oil is left in the formation if it is produced only by primary depletion, i.e., where only formation energy is employed in recovering the oil. Only a small fraction of the original oil-in-place in a hydrocarbon-bearing reservoir is expelled by primary production or natural mechanisms. Where the initial formation energy is inadequate or has become depleted through production from the well, supplemental processes referred to as secondary, and tertiary, and quaternary recovery operations are utilized in order to recover a larger percentage of the in-place oil. Waterflooding and surfactantflooding are processes well known in the art to recover the vast quantities of oil which remain in the formation after primary oil recovery operations. Designing new surfactant systems of high oil recovery efficiency and good phase stability remains a goal in this technology. This invention relates to chemicals suitable for use in enhanced recovery of crude oils from subterranean formations.

It is an object of this invention to provide new chemical compositions useful in oil recovery.

A further object of this invention is to produce surfactant system useful in surfactantflooding. Particularly, the surfactant systems should be useful in environments comprising hard brines as well as fresh or fresher water.

Yet another object of this invention is to provide an oil recovery process using the surfactant systems of this invention.

These and other objects, advantages, details, features and embodiments of this invention will become apparent to those skilled in the art from the following detailed description of the invention and the appended claims.

THE INVENTION

In accordance with the present invention, it has now been discovered that improvements in recovery of fluid hydrocarbons such as petroleum from subterranean petroleum bearing formations is achieved by introducing into the formation an alkaline hypochlorite to oxidize crude oil components and generate carboxylates and other surfactants in situ in the oil bearing formation, subsequently injecting an alcohol slug to form a carboxylate-alcohol surfactant system in situ, and thereafter causing the so-injected slugs to move from an injection well towards one or more production wells, displacing oil present in the formation. The purpose of an alcohol slug is to form carboxylate-alcohol surfactant system which is more effective than just carboxylate.

In accordance with one specific embodiment of the invention, an enhanced oil recovery process is provided comprising the sequential injection of (a) an aqueous alkaline hypochlorite slug, (b) an aqueous alkaline alcohol slug and (c) an aqueous mobility buffer composition.

In one embodiment of the invention, the mobility buffer solution is an aqueous solution containing a polymeric viscosifier or other thickening agent that can be graded back by continuous dilution to a particularly desired level of polymeric viscosifier or thickening agent.

Further, according to the invention, a caustic involving the injection of aqueous caustic to form surfactant in situ for enhancing oil recovery can precede the hypochlorite slug. The sequential injection of hypochlorite to increase the concentration of surfactant precursors in the formation is then followed by the injection of aqueous-alcoholic caustic and drive water to improve the enhanced oil recovery.

In another embodiment, the invention comprises a surfactant flood process comprising the in-situ oxidation of crude oil to generate surfactants followed by aqueous alkali and thickened water mobility buffer, wherein the improvement is the sequential injection of (1) aqueous hypochlorite to generate the surfactants (2) aqueous caustic containing an alcohol such as isopentyl alcohol and (3) a thickened aqueous mobility buffer such as an aqueous slug of polyacrylamide.

In still another embodiment, the invention comprises a surfactant flood process comprising the sequential injection of (1) aqueous hypochlorite to generate the surfactants (2) aqueous alcoholic caustic such as a NaCl brine solution of isopentyl alcohol and sodium carbonate, and (3) thickened aqueous mobility buffer such as an aqueous slug of polyacrylamide. Alternatively, a sample of crude oil can be oxidized with hypochlorite at ground level prior to injection of this oxidate mass followed sequentially by aqueous alcoholic caustic and thickened water mobility buffer.

DETAILED DESCRIPTION OF THE INVENTION

The present invention concerns an improved process for the recovery of oil in which an aqueous fluid is injected into an oil-bearing formation and displaced oil is recovered from the same formation. Particularly, the invention concerns incorporating into the aqueous injection fluid, a small but effective amount of a metallic salt of hypochlorous acid, preferably at least one of an alkali metal and alkaline earth metal hypochlorite, such as sodium hypochlorite which now is a presently preferred additive.

The amount of sodium hypochlorite present in the aqueous alkaline hypochlorite solution injected into the formation will generally be about 0.1 to about 10% by weight, preferably about 1–5% by weight.

Preferably, the aqueous alkaline solution of hypochlorite ordinarily will contain additional alkaline material. Aqueous sodium hypochlorite solution has a normal pH of 12–13 and can be used without addition of other alkaline material. However, as the sodium hypochlorite is consumed in the oxidation of the crude oil, the pH will drop and below pH 10, autodecomposition of sodium hypochlorite can occur. To help maintain a higher pH, an alkaline material, such as sodium carbonate or sodium hydroxide, can be added. The preferred pH is 10–13.

Although aqueous sodium hypochlorite solution normally has a pH of 12–13, preferably the solution will contain additional alkaline material such as sodium carbonate to act as a buffer to help maintain the pH above 10 during the oxidation reactions.

The aqueous solution of alkaline hypochlorite can be saline, hard brine, or fresh water.

Following injection of the hypochlorite solution into the formation, an aqueous solution of a suitable alcohol such as isopentyl alcohol is injected. Other alcohols that can be used in addition to isopentyl alcohol include isobutyl alcohol, isopropyl alcohol, 1-butanol, 1-pentanol, normal hexyl alcohol, and the like, and mixtures thereof. Broadly, water-soluble alcohols having from 1 to about 6 carbon atoms are employed.

Preferably, the aqueous alcohol solution contains sufficient alkaline material to provide a pH of at least about 7.5, preferably 10 to 12. Suitable alkaline materials include ammonia, compounds of alkali metals such as hydroxides, carbonates, bicarbonates, orthosilicates, silicates, phosphates, and borates or other known alkaline materials. The carbonates, such as sodium carbonate, are often used for this purpose. The aqueous alcohol solution does not have to contain alkaline material for it to be effective. The alcohol is the important part. Preferably, the aqueous alcohol solution contains alkaline material to give a pH of 7.5–13. The most preferred pH is 10–12.

Following injection of the aqueous alkaline hypochlorite slug to form surfactants in situ, it is followed by injection of an aqueous alcoholic solution. It is presently preferred, although not necessary, to inject a mobility buffer solution into the reservoir. This buffer helps prevent fingering and enhances the efficiency of the oil recovery. Buffer solutions are aqueous solutions of polymeric viscosifiers or other thickening agents. Examples of useful mobility buffers are aqueous fluids containing mobility reducing agents, such as high molecular weight partially hydrolyzed polyacrylamides, biopolysaccharides, soluble cellulose ethers, and the like. The mobility buffer comprises 50 to 20,000, preferably 200 to 5,000 ppm of the mobility reducing agent in the fluid.

The concentration of thickening agent in the mobility buffer fluid can remain constant over the injection period or the mobility buffers slug can be "graded", i.e., the viscosifier concentration starts out at a relatively high level at the beginning of the injection and the concentration tapers off toward the end of the injection period. As an example, the aqueous mobility buffer slug can start with a concentration of 2500 ppm of polyacrylamide and be graded back by continuous dilution to 250 ppm of poyacrylamide. The "grading" of mobility buffer fluids is well known in the art.

A cosurfactant other than an alcohol can be used. The cosurfactant could be an alcohol, phenol, mercaptan, or gycol of 1-18 carbon atoms per molecule which has been ethoxylated or propoxylated with 1 to 12 ethylene oxide and/or propylene oxide units per molecule. The preferred cosurfactants are ordinary alcohols of 3 to 5 carbons like isopropyl alcohol, isobutyl alcohol, isopentyl alcohol, 1-pentanol, and 1-butanol. The present invention can be utilized for a variety of subterranean reservoirs including reservoirs containing hard brine connate water.

In actual operation the compositions of the invention can be injected into subterranean formations in several different ways. For example, in one embodiment the process comprises injecting step-wise (1) an aqueous alkaline hypochlorite solution, (2) an aqueous alkaline alcohol solution, and (3) a mobility buffer solution. It is also within the scope of the invention to inject a sample of crude oil oxidized with hypochlorite at ground level followed by injection of alkaline hypochlorite and/or aqueous alkaline alcohol solution and, if desired, a mobility buffer solution or other drive fluid. Similarly, the alcohol can be combined with the mobility buffer solution rather than separate introduction.

The following examples are intended to further illustrate the invention without unduly limiting the scope thereof.

EXAMPLE I

This example demonstrates the oil recovery efficiency of the inventive process comprising the sequential injection of aqueous alkaline sodium hypochlorite, aqueous alcoholic caustic and thickened aqueous mobility buffer.

Waterflood residual oil from an epoxy coated, waterwet Berea sandstone core was recovered using the above sequence. A stock solution of aqueous alkaline sodium hypochlorite was prepared by combining 16 g sodium chloride, 2 g sodium carbonate, 160 g Clorox and 622 g distilled water. Thus, the concentration of each component in this solution was as follows: 2 weight percent NaCl, 0.25 weight percent $Na_2CO_3$, ca. 1 weight percent sodium hypochlorite and about 97 weight percent distilled water. A stock solution of aqueous alcoholic caustic was prepared by combining 4 g sodium chloride, 3 g sodium carbonate, 6 g isopentyl alcohol and 187 g distilled water. Thus, the concentration of each component in this solution was as follows: 2 weight percent NaCl, 1.5 weight percent $Na_2CO_3$, 3 weight percent isopentyl alcohol and 93.5 weight percent distilled water. A stock solution of polyacrylamide (mobility buffer) was prepared by dissolving 0.96 g Betz Hi Vis polyacrylamide and 1.5 g $Na_2CO_3$ in 500 mL of distilled water. Thus, the resulting solution contained $Na_2CO_3$ (solution viscosity 44.3 centipoise, 6 rpm @ 120° F.).

The pore volume of the 3"×1' cylindrical Berea sandstone core was 270.2 mL. Since a total of 613.5 mL of the first slug was injected, the aqueous alkaline hypochlorite used amounted to 2.27 pore volumes. A total of 94.5 mL of aqueous alcoholic caustic (0.35 pore volume) was used in the second slug and 135.1 mL (0.5 pore volume) of the aqueous polyacrylamide solution followed as the mobility buffer. The mobility buffer was graded back logarithmically with 0.3 weight percent aqueous sodium carbonate solution.

In preparing the core, 196 mL of water was displaced from the water-saturated core by oilood indicating the introduction of approximately 196 mL of oil into the core. Subsequent waterflood resulted in approximately 106.2 mL of oil being displaced from the core leaving about 89.8 mL of waterflood residual oil in the Berea sandstone core prior to the hypochlorite flood.

In the course of the inventive flood, a total effluent of 4.5 pore volumes (ca. 1210 mL) was collected which contained 65 mL of tertiary oil representing 72.3% of the waterflood residual oil.

EXAMPLE 2

This example demonstrates the oil recovery efficiency of the inventive process carried out at a salinity of 1 weight percent NaCl. This procedure was essentially the same as that used in Example 1 wherein the salinity was 2 weight percent NaCl rather than 1 weight percent NaCl. The hypochlorite slug was 1 weight percent NaCl, 1 weight percent NaOCl, 0.25 weight percent $Na_2CO_3$ and about 98 weight percent distilled water. The aqueous alcoholic caustic slug contained 1 weight percent NaCl, 1.5 weight percent $Na_2CO_3$, 3 weight percent isopentyl alcohol and about 94.5 weight percent distilled water. The mobility buffer slug contained about 1900 ppm polyacrylamide and 0.3 weight percent sodium carbonate.

The pore volume of the $3'' \times 1'$ cylindrical Berea sandstone core was 254.7 mL. In this run, the following slug sizes were used: 596.9 mL (2.34 pore volumes) of aqueous alkaline hypochlorite, 118.9 mL (0.46 pore volume) of aqueous alcoholic caustic and 127.3 mL (0.5 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water, 181.8 mL of water was displaced from the water-saturated core by oilflood indicating the introduction of approximately 181.8 mL of oil into the core. Subsequent waterflood resulted in approximately 93.9 mL of oil being displaced from the core leaving about 87.9 mL of waterflood residual oil in the Berea sandstone core prior to the hypochlorite flood.

In the course of the inventive flood, a total effluent of 5.9 .56 pore volumes (ca. 1505 mL) was collected which contained 69.2 mL of tertiary oil representing 78.7% of the waterflood residual oil.

EXAMPLE 3

This example demonstrates the efficiency of the inventive process to recover oil from a Berea sandstone core using a second slug which contained 1-hexanol as cosurfactant rather than isopentyl alcohol. The procedure was essentially identical to that used in Example 2. The hypochlorite slug contained 1 weight percent NaCl, about 1 weight percent NaOCl, 0.25 weight percent $Na_2CO_3$ and the remainder was water. The aqueous alcoholic caustic slug contained 1 weight percent NaCl, 1.5 weight percent $Na_2CO_3$, 3 weight percent 1-hexanol and about 94.5 weight percent water. The mobility buffer slug contained about 1900 ppm polyacrylamide and 0.3 weight percent sodium carbonate.

The pore volume of the $3'' \times 1'$ cylindrical Berea sandstone core was 257.8 mL. In this run, the following slug sizes were used: 592.9 mL (2.3 pore volumes) of aqueous alkaline hypochlorite, 139 mL (0.53 pore volume) of aqueous alcoholic caustic and 128.9 mL (0.25 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water 186 mL of water was displaced from the water-saturated core by oilflood indicating the introduction of approximately 186 mL of oil into the core. Subsequent waterflood resulted in approximately 96 mL of oil being displaced from the core leaving about 90 mL of waterflood residual oil in the Berea sandstone core prior to the hypochlorite flood.

In the course of the inventive flood a total effluent of 4.94 pore volumes (ca. 1274 ml) was collected which contained 67.7 mL of tertiary oil representing 75.2% of the waterflood residual oil.

EXAMPLE 4

This example demonstrates the efficiency of the inventive process to recover oil from a Berea sandstone core using a second slug which contained isobutyl alcohol as cosurfactant rather than isopentyl alcohol. The procedure was essentially identical to that used in Example 1. The hypochlorite slug contained 2 weight percent NaCl, about 1 weight percent NaOCl, 0.25 weight percent $Na_2CO_3$ and the balance was water. The aqueous alcoholic caustic slug contained 2 weight percent NaCl, 1.5 weight percent $Na_2CO_3$, 3 weight percent isobutyl alcohol and about 94 weight percent water. The mobility buffer slug contained about 1900 ppm polyacrylamide and 0.3 weight percent sodium carbonate.

The pore volume of the $3'' \times 1'$ cylindrical Berea sandstone core was 262.5 mL. In this run, the following slug sizes were used: 603.75 mL (2.3 pore volumes) of aqueous alkaline hypochlorite, 91.8 mL (0.35 pore volume) of aqueous alcoholic caustic and 131.2 mL (0.5 pore volume) of aqueous polyacrylamide mobility buffer. The mobility buffer was graded back logarithmically with 0.3 weight percent aqueous sodium carbonate solution.

In preparing the core with 2 weight percent NaCl in Arkansas-Burbank water, 193.6 mL of water was displaced from the water-saturated core by oilflood indicating the introduction of approximately 193.6 mL of oil into the core. Subsequent waterflood resulted in approximately 101.8 mL of oil being displaced from the core leaving about 91.8 mL of waterflood residual oil in the Berea sandstone core prior to the hypochlorite flood.

In the course of the inventive flood, a total effluent of 5.46 pore volumes (ca. 1434 mL) was collected which contained 60.8 mL of tertiary oil representing 66.2% of the waterflood residual oil.

EXAMPLE 5

This example demonstrates the effectiveness of the inventive process to recover oil from a Berea sandstone core using an initial slug which contained no added sodium carbonate. The procedure was essentially identical to that used in Example 2. The aqueous hypochlorite slug contained 1 weight percent NaCl and about 1 weight percent NaOCl but no added $Na_2CO_3$. The aqueous alcoholic caustic slug contained 1 weight percent NaCl, 1.5 weight percent $Na_2CO_3$, 3 weight percent isopentyl alcohol and about 94.5 weight percent water. The mobility buffer slug contained about 1900 ppm polyacrylamide and 0.3 weight percent sodium carbonate.

The pore volume of the $3'' \times 1'$ cylindrical Berea sandstone core was 264.8 mL. In this run, the following slug sizes were used: 641 mL (2.4 pore volumes) of aqueous hypchlorite, 121.8 mL (0.46 pore volume) of aqueous alcohlic caustic and 132.4 mL (0.5 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water 195.6 mL of water was displaced from the water-saturated core by oilflood indicating the introduction of approximately 195.6 mL of oil into the core. Subsequent waterflood resulted in approximately 109.4 mL of oil being displaced from the core leaving about 86.2 mL of waterflood residual oil in the Berea sandstone core prior to the hypochlorite flood.

In the course of the inventive flood, a total effluent of 4.68 pore volumes (ca. 1245 mL) was collected which contained 54.9 mL of tertiary oil representing 63.6% of the waterflood residual oil.

EXAMPLE 6

This example demonstrates the effectiveness of the inventive process to recover oil from a Berea sandstone core using an initial 0.46 pore volume hypochlorite slug containing about 5 weight percent NaOCl. In addition, this slug was injected into a Berea sandstone core (containing waterflood residual oil) and allowed to stand in said core for some 36 hours before injection of the aqueous alcoholic caustic slug. Otherwise, the procedure was essentially identical to that used in the foregoing examples. The aqueous hypochlorite slug (0.46) pore volume) contained 1.25 weight percent added $Na_2CO_3$ and about 5 weight percent NAOCl with no added NaCl. The stock solution of hypochlorite (by analysis) contained about 5 weight percent NaOCl and 10 g anhydrous $Na_2CO_3$ had been added to 790 g of said hypochlorite solution to give a total of 800 g of mix. The aqueous alcoholic caustic slug contained 2 weight percent NaCl, 1.5 weight percent $Na_2CO_3$, 3 weight percent isopentyl alcohol and about 94 weight percent water. The mobility buffer slug contained about 1900 ppm polyacrylamide and 0.3 weight percent sodium carbonate.

The pore volume of the $3'' \times 1'$ cylindrical Berea sandstone core was 277 mL. In this run, the following slug sizes were used: 127.4 mL (0.46 pore volume) of aqueous hypochlorite, 88.8 mL (0.32 pore volume) of aqueous alcoholic caustic and 138.5 mL (0.5 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water 201.9 mL of water was displaced from the water-saturated core by oilflood indicating the introduction of approximately 201.9 mL of oil into the core. Subsequent waterflood resulted in approximately 104.3 mL of oil being displaced from the core leaving about 97.6 mL of waterflood residual oil in the Berea sandstone core prior to the hypochlorite flood.

In the course of the inventive flood, a total effluent of 2.64 pore volumes (ca. 733 mL) was collected which contained 44.8 mL of tertiary oil representing 45.9% of the waterflood residual oil.

EXAMPLE 7

This example demonstrates the effectiveness of the inventive process to recover oil from a Berea sandstone core using an initial 0.81 pore volume hypochlorite slug containing 1.0 weight percent NaOCl. In addition, this slug was injected into a Berea sandstone core (containing waterflood residual oil) and allowed to stand in said core for some 20 hours before injection of the aqueous alcoholic caustic slug. Otherwise, the procedure was essentially identical to that used in the foregoing examples. The aqueous hypochlorite slug contained 1 weight percent NaCl, 1.0 weight percent NaOCl and 0.25 weight percent $Na_2CO_3$. The aqueous alcoholic caustic slug contained 1 weight percent NaCl, 1.5 weight percent $Na_2CO_3$, 3 weight percent isopentyl alcohol and about 94 weight percent water. The mobility buffer slug contained about 1900 ppm polyacrylamide and 0.3 weight percent sodium carbonate.

The pore volume of the $3'' \times 1'$ cylindrical Berea sandstone core was 263 mL. In this run, the following slug sizes were used: 213 mL (0.81 pore volume) of aqueous hypochlorite, 81.9 mL (0.31 pore volume) of aqueous alcoholic caustic and 131.5 mL (0.5 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water, 195.5 mL of water was displaced from the water-saturated core by oilflood indicating the introduction of approximately 195.5 mL of oil into the core. Subsequent waterflood resulted in approximately 96 mL of oil being displaced from the core leaving about 100.5 mL of waterflood residual oil in the Berea sandstone core prior to the hypochlorite flood.

In the course of the inventive flood, a total effluent of 4.75 pore volumes (ca. 1251 mL) was collected which contained 37.3 mL of tertiary oil representing 37.1% of the waterflood residual oil.

EXAMPLE 8

This example demonstrates the efficiency of the inventive process to recover oil from a Berea sandstone core using slugs which differed in composition from those used in Example 7 as follows: (a) slug one contained 0.5 weight percent $Na_2CO_3$ rather than 0.25 weight percent $Na_2CO_3$ and (b) slug two contained 2 weight percent NaCl rather than 1 weight percent NaCl and 1 weight percent $Na_2CO_3$ rather than 1.5 weight percent $Na_2CO_3$. Otherwise, the procedure was essentially identical to that used in Example 7. The aqueous hypochlorite slug contained 1 weight percent NaCl, 1.0 weight percent NaOCl and 0.5 weight percent $Na_2CO_3$. The aqueous alcoholic caustic slug contained 2 weight percent NaCl, 1 weight percent $Na_2CO_3$, 3 weight percent isopentyl alcohol and about 94 weight percent water. The mobility buffer slug contained about 1900 ppm polyacrylamide and 0.3 weight percent sodium carbonate.

The pore volume of the $3'' \times 1'$ cylindrical Berea sandstone core was 272.4 mL. In this run, the following slug sizes were used: 220.6 mL (0.81 pore volume) of aqueous hypochlorite, 83.8 mL (0.31 pore volume) of aqueous alcoholic caustic and 136.2 mL (0.5 pore volume) of aqueous polyacrylamide mobility buffer. The mobility buffer was graded back logarithmically with 0.3 weight percent aqueous sodium carbonate solution.

In preparing the core with 1 weight percent NaCl in Arkansas-Burbank water 196.9 mL of water was displaced from the water-saturated core by oilflood indicating the introduction of approximately 196.9 mL of oil into the core. Subsequent waterflood resulted in approximately 96 mL of oil being displaced from the core leaving about 100.9 mL of waterflood residual oil in the Berea sandstone core prior to the hypochlorite flood.

In the course of the inventive flood, a total effluent of 5.22 pore volumes (ca. 1150 mL) was collected which contained 49.2 mL of tertiary oil representing 48.8% of the waterflood residual oil.

The results of Examples 1-8 are set forth in Table I.

TABLE I

Alkaline Hypochlorite Flooding Results#

| Example | % TOR* | Cosurfactant | Slug Sequence | NaOCl Pore Volume (Slug No. 1) |
|---|---|---|---|---|
| 1 | 72.3 | IAA[a] | ABC[d] | 2.27 |
| 2 | 78.7 | IAA[a] | ABC[d] | 2.34 |
| 3 | 75.2 | NHA[b] | ABC[d] | 2.3 |
| 4 | 66.2 | IBA[c] | ABC[d] | 2.3 |
| 5 | 63.6 | IAA[a] | ABC[d] | 2.4 |
| 6 | 45.9 | IAA[a] | A;BC[e] | 0.46 |
| 7 | 37.1 | IAA[a] | A;BC[f] | 0.81 |
| 8 | 48.8 | IAA[a] | A;BC[f] | 0.81 |

The concentration of NaOCl in all runs was ca. 1 weight percent except for run 6 which contained 5 weight percent NaOCl in slug 1.
*TOR represents tertiary oil recovery, i.e., percent of waterflood residual oil recovered
[a]IAA represents isopentyl alcohol (isomyl alcohol)
[b]represents normal hexyl alcohol
[c]IBA represents isobutyl alcohol
[d]The usual slug sequence was (i) aqueous alkaline hypochlorite, (ii) aqueous alcoholic caustic, (iii) thickened aqueous mobility buffer with no delay between the consecutive injections
[e]The aqueous hypochlorite slug was injected and allowed to remain in contact with the core containing waterflood residual oil for 36 hours before the sequential injection of the aqueous alcoholic caustic and mobility buffer slugs
[f]Similar injection pattern as cited in footnote (e) with a time interval of 20 hours rather than 36 hours.

Referring to the Examples in Table I, numbers 1-5 are representative of the injection sequence of aqueous alkaline hypochlorite, aqueous alcoholic caustic and thickened aqueous mobility buffer. Referring to Examples, 2, 3 and 4, it is evident that isopentyl, n-hexyl and isobutyl alcohols can be used as cosurfactants in the inventive process. The addition of sodium carbonate to the hypochlorite slug in Example 2, e.g, may have aided recovery as the recovery was lower in Example 5 wherein no $Na_2CO_3$ was added to the aqueous hypochlorite slug. The salinities in all the runs varied over the range of 1-2 weight percent NaCl.

EXAMPLE 9

This example demonstrates recovery of waterflood residual oil from a waterwet Berea sandstone core by the sequential injection of (1) aqueous alkaline sodium hypochlorite, (2) thickened aqueous polyacrylamide solution and (3) aqueous alkaline sodium hypochlorite. This procedure was based on the prior art teaching of U.S. Pat. No. 3,709,297 (see Col. 3, lines 19-24).

The sodium hypochlorite slug was taken from a stock solution prepared by mixing 8 g sodium chloride, 2 g sodium carbonate, 160 g Clorox ® and 630 g distilled water. Thus, this solution contained 1 weight percent NaCl, 0.25 weight percent $Na_2CO_3$, about 1 weight percent sodium hypochlorite and about 97.75 weight percent water. A stock solution of polyacrylamide was prepared by mixing 0.96 g Betz Hi Vis polyacrylamide and 1.5 g sodium carbonate in 500 mL of distilled water. Thus, the polymer solution contained about 0.3 weight percent $Na_2CO_3$ and about 1900 ppm polyacrylamide. The viscosity of this solution was about 45.5 centipoise at 120° F.

The pore volume of the 3"×3' cylindrical Berea sandstone core was 248.3 mL. The initial slug of hypochlorite amounted to 1.17 pore volumes or about 290 mL. The slug of polyacrylamide amounted to 0.51 pore volume or about 126 mL. The slug of hypochlorite amounted to 1.15 pore volumes or about 286 mL. An aqueous drive slug amounting to about 4.1 pore volumes of 0.3 weight percent $Na_2CO_3$ (ca. 1020 mL) followed the final hypochlorite slug.

In preparing the Berea sandstone core, 183 mL of water was displaced from the water-saturated core by oilflood indicating the introduction of approximately 183 mL of oil into the core. Subsequent waterflood (using 1 weight percent NaCl in Arkansas-Burbank water) resulted in approximately 87.2 mL of oil being displaced from the core leaving about 95.8 mL of waterflood residual oil in the Berea sandstone core prior to the hypochlorite-polyacrylamide-hypochlorite sequence.

In the course of the hypochlorite-polyacrylamide-hypochlorite sequence, a total effluent of 6.9 pore volumes (ca. 1717 mL) was collected which contained 19.1 mL of tertiary oil representing 19.9% of the waterflood residual oil.

Attention is called to the fact that the above 19.9% tertiary oil recovery using the hypochlorite-polymer-hypochlorite sequence of the prior art patent U.S. Pat. No. 3,709,297 (Col. 3, lines 19-24) is much less than the 77% tertiary oil recovery of the instant invention.

I claim:

1. A process for the recovery of oil from an oil bearing subterranean formation penetrated by at least one injection well and at least one production well which comprises forming surfactants in situ comprising the steps of:
   (a) injecting a slug of an aqueous alkaline hypochlorite solution through an injection well under conditions to cause oxidation of oil in the formation and product surfactants comprising carboxylates;
   (b) injecting an aqueous alkaline alcohol solution to form a carboxylate-alcohol surfactant system,
   (c) causing the so-injected slugs to move from the injection well towards one or more production wells displacing oil present in said formation, and
   (d) recovering displaced oil from at least one of said production wells.

2. A process according to claim 1 wherein a mobility buffer fluid is injected into said subterranean formation following said alcohol solution slug.

3. A process according to claim 2 wherein an aqueous drive fluid is injected into said subterranean formation following said mobility buffer fluid.

4. A process according to claim 2 wherein said mobility buffer comprises polyacrylamide graded back by continuous dilution with aqueous or drive fluid.

5. A process according to claim 1 wherein said alcohol is a water-soluble alcohol having from 1 to 6 carbon atoms per molecule and said alcohol solution contains sufficient alkaline material to provide a pH of at least about 7. 5.

6. A process according to claim 1 wherein said slug in (a) comprises sodium hypochlorite, sodium carbonate, and water.

7. A process according to claim 1 wherein said alcohol solution comprises sodium carbonate, water and at least one of isopentyl alcohol, isobutyl alcohol, and normal hexyl alcohol.

8. A process according to claim 1 wherein said slug in (a) comprises sodium hypochlorite, sodium carbonate, and water and said alcohol slug in (b) comprises sodium carbonate, water and at least one of isopentyl alcohol, isobutyl alcohol, and normal hexyl alcohol.

9. A process according to claim 8 wherein a mobility buffer slug comprising polyacrylamide, sodium carbonate and water is injected following said alcohol slug.

10. A process according to claim 9 wherein said mobility buffer solution is graded back by continuous dilution logarithmically with aqueous sodium carbonate solution.

* * * * *